(12) United States Patent
Jeong et al.

(10) Patent No.: US 12,142,748 B2
(45) Date of Patent: Nov. 12, 2024

(54) BATTERY MODULE HAVING STRUCTURE CAPABLE OF RAPID COOLING, AND ESS COMPRISING SAME

(71) Applicant: LG ENERGY SOLUTION, LTD., Seoul (KR)

(72) Inventors: Ji-Won Jeong, Daejeon (KR); Sang-Hyun Jo, Daejeon (KR); Kyung-Hyun Bae, Daejeon (KR); Jin-Kyu Shin, Daejeon (KR); Jin-Kyu Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 377 days.

(21) Appl. No.: 17/788,176

(22) PCT Filed: Mar. 4, 2021

(86) PCT No.: PCT/KR2021/002713
§ 371 (c)(1),
(2) Date: Jun. 22, 2022

(87) PCT Pub. No.: WO2021/177763
PCT Pub. Date: Sep. 10, 2021

(65) Prior Publication Data
US 2023/0026257 A1 Jan. 26, 2023

(30) Foreign Application Priority Data
Mar. 5, 2020 (KR) .......................... 10-2020-0027904

(51) Int. Cl.
*H01M 10/655* (2014.01)
*H01M 10/613* (2014.01)
(Continued)

(52) U.S. Cl.
CPC ..... *H01M 10/6567* (2015.04); *H01M 10/613* (2015.04); *H01M 10/6563* (2015.04); *H01M 50/507* (2021.01)

(58) Field of Classification Search
CPC ........... H01M 10/6568; H01M 10/613; H01M 50/143; H01M 50/24; H01M 50/507;
(Continued)

(56) References Cited

U.S. PATENT DOCUMENTS 5,372,203 A * 12/1994 Galaszewski .......... A62C 37/14
169/37
2011/0159326 A1 6/2011 Oya et al.
(Continued)

FOREIGN PATENT DOCUMENTS

CN 104882639 A 9/2015
CN 106684499 A 5/2017
(Continued)

OTHER PUBLICATIONS

Machine translation of FR 2299876, retrieved from (Year: 2024).*
(Continued)

*Primary Examiner* — Cynthia K Walls
(74) *Attorney, Agent, or Firm* — Birch, Stewart, Kolasch & Birch, LLP

(57) ABSTRACT

A battery module includes a plurality of battery cells; a module housing configured to accommodate a cell stack including the plurality of battery cells; and a sprinkler provided through the module housing at one side of the cell stack in a stacking direction, and the sprinkler includes a coupler positioned at an outer side of the module housing and connected to a supply tube that supplies a cooling fluid; a sprinkler head positioned at an inner side of the module housing and connected to the coupler; and an insulation cover assembly having an insulation cover configured to
(Continued)

cover the sprinkler head and an impeller assembly configured to cover an opening formed at one side end of the insulation cover in a longitudinal direction.

15 Claims, 8 Drawing Sheets

(51) Int. Cl.
    *H01M 10/6563*    (2014.01)
    *H01M 10/6567*    (2014.01)
    *H01M 50/507*     (2021.01)
(58) Field of Classification Search
    CPC ........... H01M 10/627; H01M 10/6567; H01M 50/244; H01M 50/251; H01M 50/258; H01M 50/502; H01M 2200/10; H01M 2220/10; Y02E 60/10; A62C 37/14; A62C 3/16; A62C 2/06; A62C 35/60; A62C 35/68; A62C 2/065; A62C 37/12
    See application file for complete search history.

(56) References Cited

U.S. PATENT DOCUMENTS

| | | |
|---|---|---|
| 2012/0267453 A1 | 10/2012 | DeVaney |
| 2017/0043194 A1 | 2/2017 | Ling |
| 2018/0159151 A1 | 6/2018 | Noh |

FOREIGN PATENT DOCUMENTS

| | | | | |
|---|---|---|---|---|
| CN | 109103539 | A | 12/2018 | |
| CN | 210110902 | U | 2/2020 | |
| EP | 3 569 291 | A2 | 9/2024 | |
| FR | 2299876 | * | 9/1976 | ............ A62C 37/14 |
| JP | 55-65161 | U | 5/1980 | |
| JP | 2002-200189 | A | 7/2002 | |
| JP | 2010-186568 | A | 8/2010 | |
| JP | 2011-254906 | A | 12/2011 | |
| JP | 2014-216248 | A | 11/2014 | |
| JP | 2015-220176 | A | 12/2015 | |
| JP | 2016-83273 | A | 5/2016 | |
| JP | 2019-145235 | A | 8/2019 | |
| JP | 2019-525793 | A | 9/2019 | |
| JP | 2019-212741 | A | 12/2019 | |
| JP | 2020-520073 | A | 7/2020 | |
| KR | 10-2011-0027830 | A | 3/2011 | |
| KR | 10-2017-0116999 | A | 10/2017 | |
| KR | 10-2018-0063677 | A | 6/2018 | |
| WO | WO 2018/087682 | A1 | 5/2018 | |
| WO | WO 2019/112125 | A1 | 6/2019 | |

OTHER PUBLICATIONS

International Search Report for PCT/KR2021/002713 mailed on Jun. 17, 2021.
Extended European Search Report for European Application No. 21764688.4, dated Jul. 12, 2023.

* cited by examiner

BATTERY MODULE HAVING STRUCTURE CAPABLE OF RAPID COOLING, AND ESS COMPRISING SAME

TECHNICAL FIELD

The present disclosure relates to a battery module having a structure allowing rapid cooling and an ESS including the battery module. More specifically, the present disclosure relates to a battery module having a structure capable of rapidly operating a sprinkler when a high-temperature venting gas is leaked inside the battery module, and an ESS including the battery module.

The present application claims priority to Korean Patent Application No. 10-2020-0027904 filed on Mar. 5, 2020 in the Republic of Korea, the disclosures of which are incorporated herein by reference.

BACKGROUND ART

Currently commercialized secondary batteries include nickel cadmium batteries, nickel hydride batteries, nickel zinc batteries, and lithium secondary batteries. Among them, lithium secondary batteries are in the spotlight since they have little memory effect compared to nickel-based secondary batteries to secure free charging and discharging and also have a very low discharge rate and high energy density.

The lithium secondary battery mainly uses a lithium-based oxide and a carbon material as a positive electrode active material and a negative electrode active material, respectively. The lithium secondary battery includes an electrode assembly in which a positive electrode plate and a negative electrode plate respectively coated with a positive electrode active material and a negative electrode active material are disposed with a separator being interposed therebetween, and an exterior, namely a battery pouch exterior, for sealing and storing the electrode assembly together with an electrolyte.

Recently, secondary batteries are widely used not only in small devices such as portable electronic devices, but also in medium-sized or large-sized devices such as vehicles and energy storage systems. When used in such a medium-sized or large-sized device, a large number of secondary batteries are electrically connected to increase capacity and output. In particular, pouch-type secondary batteries are widely used in such medium-sized devices since they may be stacked easily.

Meanwhile, as the need for a large-capacity structure is increasing recently along with utilization as an energy storage source, the demand for a battery module including a plurality of secondary batteries electrically connected in series and/or in parallel is increasing.

In addition, the battery module generally has an outer housing made of a metal material to protect or store a plurality of secondary batteries from an external shock. Meanwhile, the demand for high-capacity battery modules is increasing recently.

In the case of such a high-capacity battery module, if the temperature inside the battery module increases since venting occurs in at least some of the internal battery cells, great damage may be generated. That is, if a thermal runaway phenomenon occurs due to an increase in internal temperature, the temperature of the high-capacity battery module may increase rapidly, and accordingly a large-scale ignition and/or explosion may occur.

Accordingly, it is necessary to develop a rapid and complete fire extinguishing technology to take immediate measures when an abnormal temperature rise occurs due to venting occurring in a battery cell inside the battery module.

DISCLOSURE

Technical Problem

The present disclosure is designed to solve the problems of the related art, and therefore the present disclosure is directed to rapidly operating a sprinkler when a high-temperature venting gas is leaked inside a battery module, thereby securing safety when using the battery module and an ESS.

However, the technical problem to be solved by the present disclosure is not limited to the above, and other objects not mentioned herein will be understood from the following description by those skilled in the art.

Technical Solution

In one aspect of the present disclosure, there is provided a battery module, having a cell stack including a plurality of battery cells; a module housing configured to accommodate the cell stack; and a sprinkler provided through the module housing at one side of the cell stack in a stacking direction, wherein the sprinkler includes: a coupler positioned at an outer side of the module housing and configured to be connected to a supply tube that supplies a cooling fluid; a sprinkler head positioned at an inner side of the module housing and connected to the coupler; and an insulation cover assembly having an insulation cover configured to cover the sprinkler head and an impeller assembly configured to cover an opening formed at a first end of the insulation cover in a longitudinal direction.

The sprinkler head may include a glass bulb provided to block a cooling fluid injection hole of the coupler and configured to be ruptured to open the cooling fluid injection hole when temperature or a flow rate of gas inside the battery module increases over a reference value; and a holding bracket configured to fix the glass bulb while surrounding the glass bulb.

The insulation cover may have a cover hole formed at a location corresponding to the glass bulb.

The impeller assembly may include an impeller frame fixed to the insulation cover and having an air input hole; and an impeller disposed in the air input hole and configured to rotate due to the flow of air introduced through the air input hole toward the glass bulb.

The module housing may include a pair of base covers configured to cover a lower surface and an upper surface of the cell stack, respectively; a pair of side covers configured to cover side surfaces of the cell stack; a front cover configured to cover a front surface of the cell stack; and a rear cover configured to cover a rear surface of the cell stack.

The battery module may comprise a pair of bus bar frames coupled to a first side and a second side of the cell stack in a width direction, respectively.

The sprinkler head and the insulation cover assembly may be provided through the rear cover and positioned in an empty space formed between a first bus bar frame of the pair of bus bar frames and a first side cover of the pair of side covers.

A second end of the insulation cover may be coupled to an inner surface of the module housing or the coupler.

A bonding layer may be interposed between the second end of the insulation cover and the inner surface of the module housing or between the second end of the insulation cover and the coupler.

The insulation cover assembly may be separated from the inner surface of the module housing or the coupler when temperature inside the module housing rises so that the bonding force of the bonding layer is lost or decreased.

The battery module may comprise at least one guide plate fixed inside the module housing and inclined so that one longitudinal end thereof is oriented toward the impeller assembly.

The battery module may comprise an air inlet formed through the front cover; an air outlet formed through the rear cover; and an expansion pad disposed at an inner side of the air inlet and the air outlet and configured to at least partially close the air inlet and the air outlet by expanding when contacting the cooling fluid introduced into the battery module.

The expansion pad may be at least partially inserted into an accommodation groove formed at an inner surface of the module housing.

The battery module may comprise mesh plates respectively disposed at opposite sides of the expansion pad to guide an expanding movement of the expansion pad.

Meanwhile, an ESS according to an embodiment of the present disclosure comprises a plurality of battery modules according to the present disclosure as described above.

Advantageous Effects

According to an embodiment of the present disclosure, when a high-temperature venting gas is leaked inside a battery module, it is possible rapidly operate a sprinkler, thereby securing safety when using the battery module and an ESS.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Figure 1:
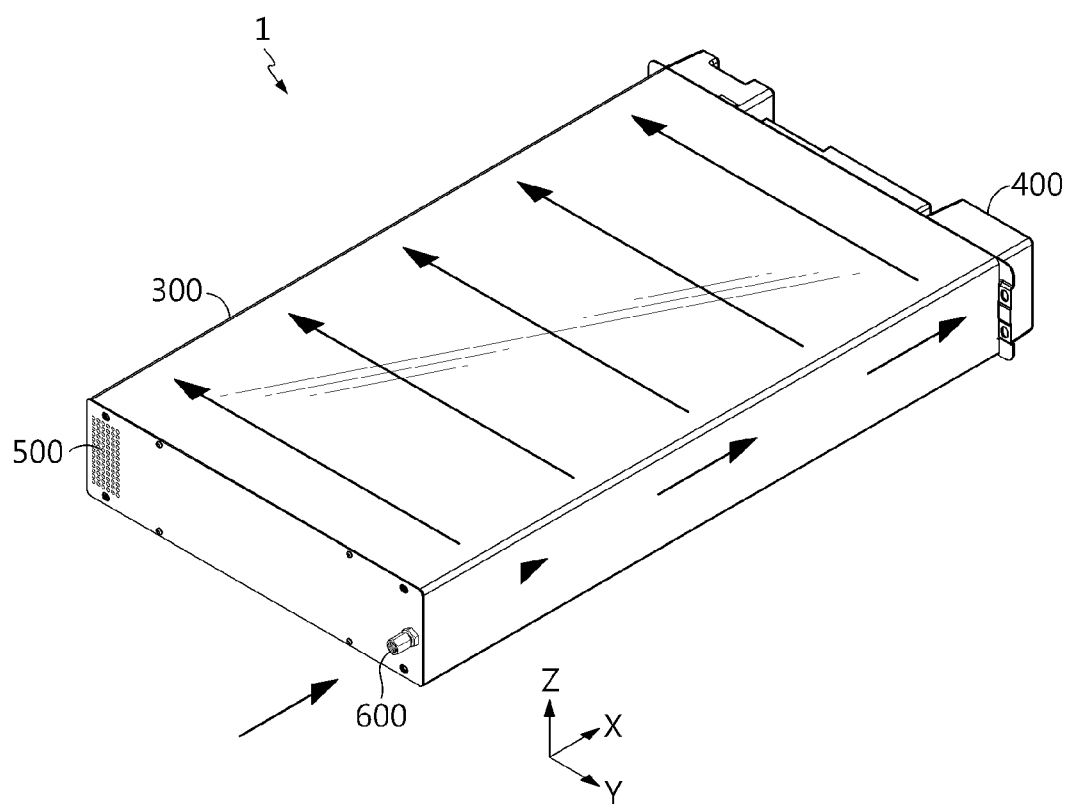
FIGS. 1 and 2 are perspective views showing a battery module according to an embodiment of the present disclosure.
Figure 2:
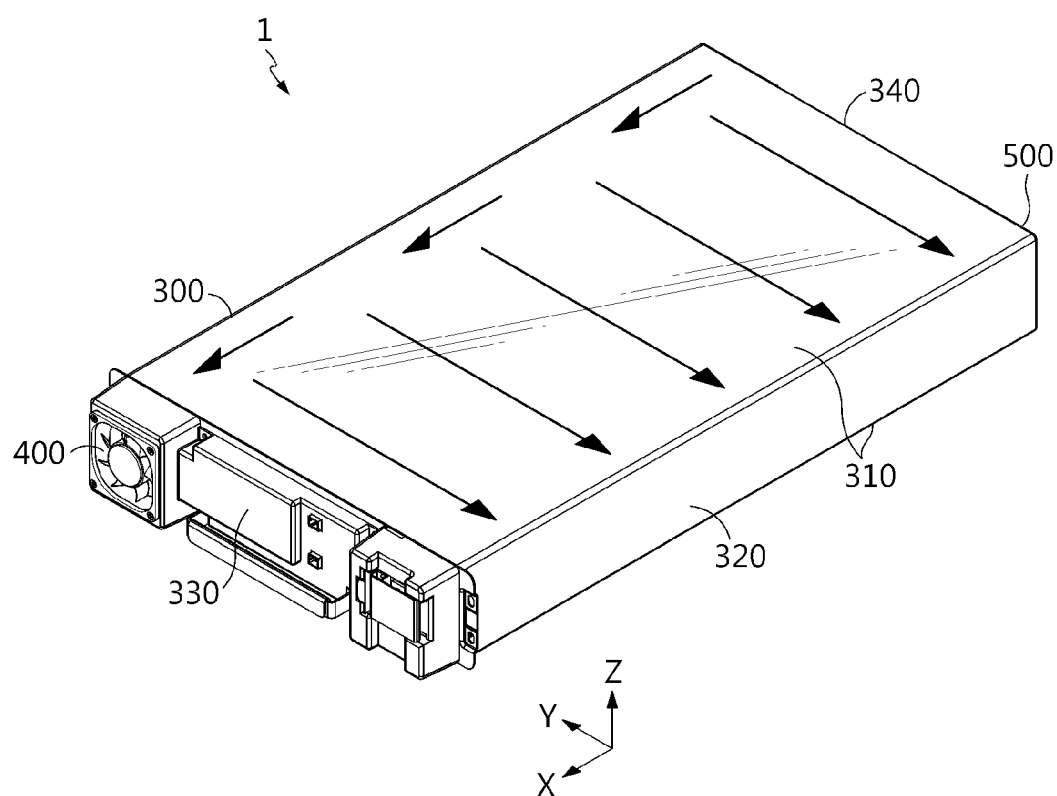
Figure 3:
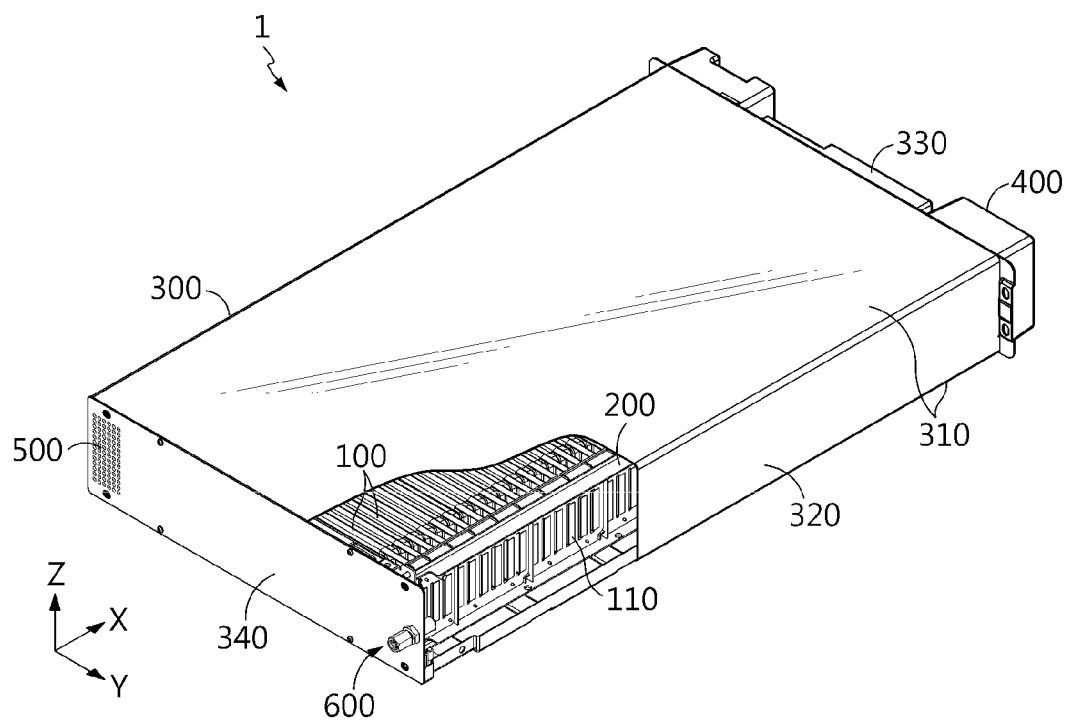
FIGS. 3 and 4 are diagrams showing an inner structure of the battery module depicted in FIGS. 1 and 2.
Figure 4:
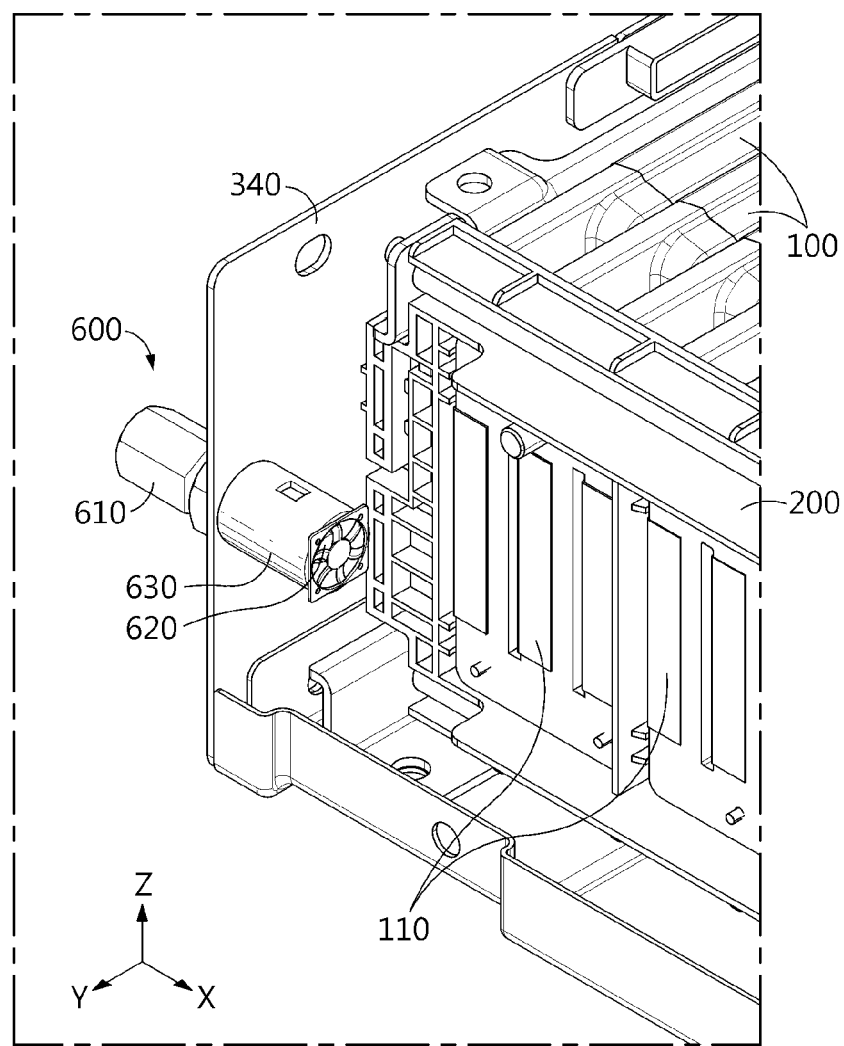

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

First, an overall structure of a battery module 1 according to an embodiment of the present disclosure will be described with reference to FIGS. 1 to 4.

Referring to FIGS. 1 to 4, the battery module 1 according to an embodiment of the present disclosure includes a plurality of battery cells 100, a bus bar frame 200, a module housing 300, an air inlet 400, an air outlet 500, and a sprinkler 600.

The battery cell 100 is provided in plural, and the plurality of battery cells 100 are stacked to form one cell stack. The battery cell 100 may employ, for example, a pouch-type battery cell. The battery cell 100 includes a pair of electrode leads 110 respectively drawn out at both sides in a longitudinal direction (a direction parallel to the Y axis shown in the figure). Meanwhile, although not shown in the drawings, the cell stack may further include a buffer pad provided between the battery cells 100 adjacent to each other, if necessary. When the cell stack is accommodated in the module housing 300, the buffer pad allows the cell stack to be accommodated in a compressed state, thereby limiting movement caused by external shocks and suppressing a swelling phenomenon of the battery cells 100.

The bus bar frame 200 is provided in a pair, and the pair of bus bar frames 200 cover one side and the other side of the cell stack in a width direction (a direction parallel to the Y axis in the figure). The electrode lead 110 of the battery cell 100 is drawn through a slit formed at the bus bar frame 200, and is bent and fixed by welding or the like onto a bus bar provided to the bus bar frame 200. That is, the plurality of battery cells 100 may be electrically connected by the bus bar provided to the bus bar frame 200.

The module housing 300 has a substantially rectangular parallelepiped shape, and accommodates the cell stack therein. The module housing 300 includes a pair of base covers 310 respectively configured to cover a lower surface and an upper surface of the cell stack (surfaces parallel to the X-Y plane), a pair of side covers 320 respectively configured to cover side surfaces of the cell stack (surfaces parallel to the X-Z plane), a front cover 330 configured to cover a front surface of the cell stack (a surface parallel to the Y-Z plane), and a rear cover 340 configured to cover a rear surface of the cell stack (a surface parallel to the Y-Z plane).

The air inlet 400 is formed at one side of the cell stack in the stacking direction (a direction parallel to the X axis), namely at one side of the battery module 1 in the longitudinal direction and has a hole shape formed through the front cover 330. The air outlet 500 is formed at the other side of the cell stack in the stacking direction, namely at the other side of the battery module 1 in the longitudinal direction and is has a hole shape formed through the rear cover 340. The air inlet 400 and the air outlet 500 are located at diagonally opposite sides along the longitudinal direction (a direction parallel to the X axis) of the battery module 1.

Meanwhile, an empty space is formed between the bus bar frame 200 and the side cover 320. That is, the empty space in which air for cooling the battery cell 100 flows is formed between one of six outer surfaces of the module housing 300 facing one side and the other side of the battery cell 100 in the longitudinal direction (a direction parallel to the Y axis) and the bus bar frame 200. The empty space is formed at each of both sides of the battery module 1 in the width direction (a direction parallel to the Y axis).

The air inlet 400 is formed at a location corresponding to the empty space formed at one side of the battery module 1 in the width direction (a direction parallel to the Y axis), and the air outlet 500 is formed at a location corresponding to the empty space formed at the other side of the battery module 1 in the width direction.

In the battery module 1, the air introduced therein through the air inlet 400 cools the battery cell 100 while moving from the empty space formed at one side of the battery module 1 in the width direction to the empty space formed at the other side of the battery module 1 in the width direction, and then goes out through the air outlet 500. That is, the battery module 1 corresponds to an air-cooled battery module.

Meanwhile, in the present disclosure, the air inlet 400 may also be used for cooling to serve as a passage through which a heated air risen is discharged, unlike its name. Also, the air outlet 500 may also be used as a passage through which an external air for cooling is introduced, unlike its name. That is, an impeller for forced ventilation may be installed at the air inlet 400 and/or the air outlet 500, and the direction of air circulation may vary depending on a rotation direction of the impeller.

The sprinkler 600 is connected to a supply tube (not shown) that supplies a cooling fluid such as a cooling water, and the sprinkler 600 operates when the temperature inside the battery module 1 or a flow rate of gas inside the battery module 1 increases over a certain level, thereby supplying the cooling fluid into the battery module 1. In other words, if an abnormal situation occurs in the battery cell 100 to cause venting so that a high-temperature gas is discharged, the sprinkler 600 detects the high-temperature gas and operates. If the sprinkler 600 operates in this way, the cooling fluid may be supplied into the battery module 1 to prevent the battery cell 100 from being ignited and/or exploded due to overheating.

A part of the sprinkler 600 is exposed out of the rear cover 340, and the other part of the sprinkler 600 is provided through the rear cover 340 and positioned in an empty space formed between the bus bar frame 200 and the side cover 320. The sprinkler 600 is installed at a side opposite to the air outlet 500 that is formed on one side of the rear cover 340 in a longitudinal direction (a direction parallel to the Y axis).

The sprinkler 600 includes a coupler 610, a sprinkler head 620 and an insulation cover assembly 630. The coupler 610 is positioned at an outer side of the module housing 300 and is connected to the supply tube (not shown) that supplies the cooling fluid. That is, the coupler 610 is made of a metal material and is a component for fastening an external supply tube. The sprinkler head 620 is positioned at an inner side of the module housing 300 and connected to the coupler 610. The insulation cover assembly 630 covers the sprinkler head 620, thereby preventing the sprinkler head 620 from coming into direct contact with the electrode lead 110 of the battery cell 100 and/or the bus bar of the bus bar frame 200 to cause a short circuit. In addition, the insulation cover assembly 630, explained later, has a function of inducing the gas heated due to a temperature rise inside the module housing 300 to flow toward the sprinkler head 620 intensively.

Figure 5:
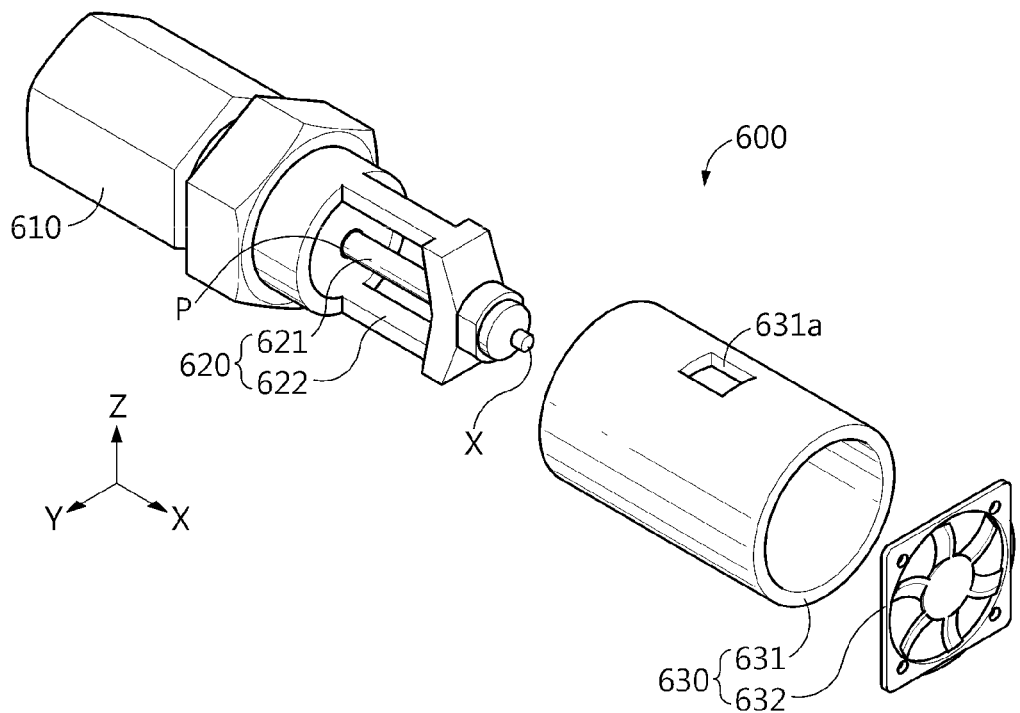
FIG. 5 is a diagram showing a sprinkler applied to the present disclosure.

Referring to FIG. 5, the sprinkler head 620 includes a glass bulb 621 and a holding bracket 622.

The glass bulb 621 blocks a cooling fluid injection hole P of the coupler 610, and if the temperature inside the battery module 1 or the flow rate of the internal gas heated by the venting gas increases over a reference value, the glass bulb 621 is ruptured to open the cooling fluid injection hole P. The glass bulb 621 contains a liquid that expands as the temperature rises, and the liquid expands if venting occurs in at least some of the battery cells 100 inside the battery module 1 so that the high-temperature venting gas fills in the battery module 1. As the liquid expands, the internal pressure of the glass bulb 621 increases, and at the same time, if the external force of the gas acts together due to the high-pressure venting gas at the outside of the glass bulb 621, the glass bulb 621 is ruptured, so the cooling fluid fills the inside of the module housing 300 through the cooling fluid injection hole P. The holding bracket 622 is made of a metal material and surrounds the glass bulb 621 to fix the glass bulb 621 not to move.

Figure 6:
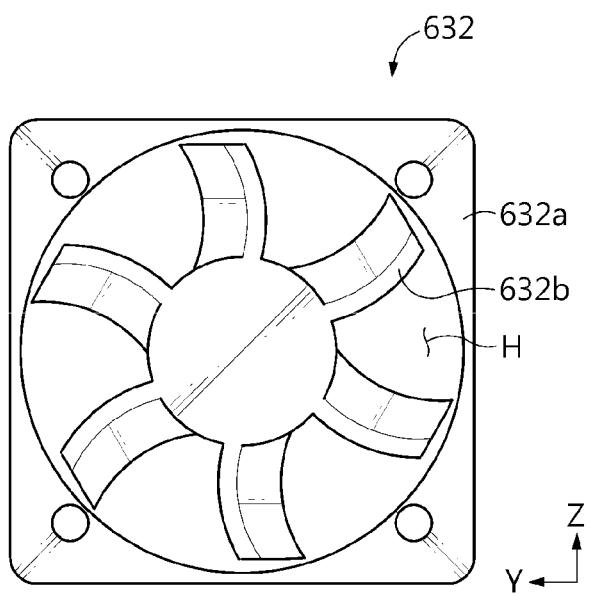
FIG. 6 is a diagram showing an impeller assembly applied to the present disclosure.

Referring to FIGS. 5 and 6, the insulation cover assembly 630 includes an insulation cover 631 and an impeller assembly 632. The insulation cover 631 has a substantially hollow cylindrical shape that surrounds the sprinkler head 620. An impeller assembly 632 is attached in an opening formed at one side end of the insulation cover 631 in a longitudinal direction (a direction parallel to the X axis in the drawing), and the inner side of the rear cover 340 of the module housing 300 or the coupler 610 provided through the rear cover 340 is coupled to the other side end of the insulation cover 631 in the longitudinal direction.

The insulation cover 631 has at least one cover hole 631*a* formed at a location corresponding to the glass bulb 621. The cover hole 631*a* functions as a passage through which the high-temperature gas introduced into the insulation cover 631 by the impeller assembly 632 comes into contact with the glass bulb 621 and then escapes to the outside of the insulation cover 631. In addition, the cover hole 631*a* may also function as a passage through which the cooling fluid injected through the fluid injection hole P due to the rupture of the glass bulb 621 may be discharged to the outside of the insulation cover 631.

Meanwhile, a bonding layer (not shown) may be interposed between the other side end of the insulation cover 631 and the inner surface of the rear cover 340 of the module housing 300 or between the other side end of the insulation cover 631 and the coupler 610 provided through the rear cover 340. If the temperature inside the module housing rises, the bonding force of the bonding layer is lost or decreased, and accordingly the insulation cover 631 may be separated from the inner surface of the rear cover 340 or the coupler 610 provided through the rear cover 340. If the insulation cover 631 surrounding the sprinkler head 620 is removed as above, the cooling fluid is supplied into the module housing 300 more smoothly, thereby increasing the fire extinguishing efficiency and the cooling efficiency.

The impeller assembly 632 includes an impeller frame 632*a* and an impeller 632*b*. The impeller frame 632*a* is fixed at one longitudinal end of the insulation cover 631 and has an air input hole H with a size and shape corresponding to the opening formed at the one longitudinal end of the insulation cover 631. The impeller 632*b* is disposed in the air input hole H of the impeller frame 632*a* and rotates due to the flow of air introduced toward the glass bulb 621 through the air input hole H. That is, the impeller 632*b* corresponds to a non-powered rotating means that rotates without a driving device such as a motor.

As the impeller 632b rotates, the flow of air introduced into the insulation cover 631 is accelerated, and accordingly a larger amount of high-temperature gas may be supplied to the glass bulb 621 to induce rapid rupture of the glass bulb 621. The gas coming into contact with the glass bulb 621 as above is discharged to the outside of the insulation cover 631 through the cover hole 631a formed in the insulation cover 631.

A rotary shaft X of the impeller 632b may be formed at one side end of the holding bracket 622 in a longitudinal direction (a direction parallel to the X axis) as shown in FIG. 5, or alternatively, the rotary shaft X may also be provided to the impeller frame 632a itself.

Figure 7:
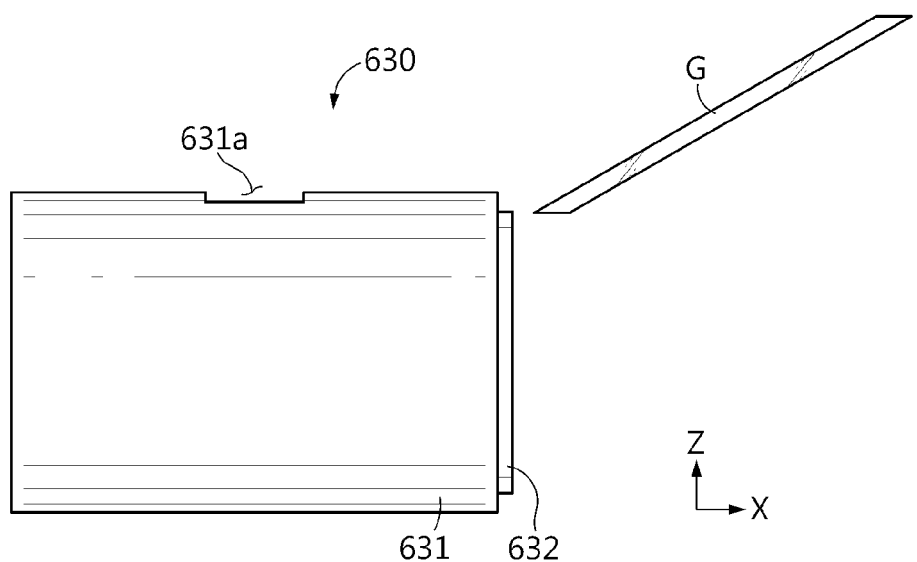
FIG. 7 is a diagram showing a location relationship between the sprinkler and the guide plate applied to the present disclosure.

Referring to FIG. 7, the battery module 1 according to an embodiment of the present disclosure may further include at least one guide plate G. The guide plate G is fixed in the module housing 300 and may be installed to be inclined such that its one side end in a longitudinal direction (a direction parallel to the X axis) is oriented toward the impeller assembly 632. The guide plate G may be separately manufactured and attached to the side cover 320, or may be formed integrally with the side cover 320.

The gas, which has a strong tendency to move upward as the temperature rises inside the battery module 1, may be induced to flow toward the sprinkler 600 by the guide plate G, thereby enabling rapid rupture of the glass bulb 621.

Figure 8:
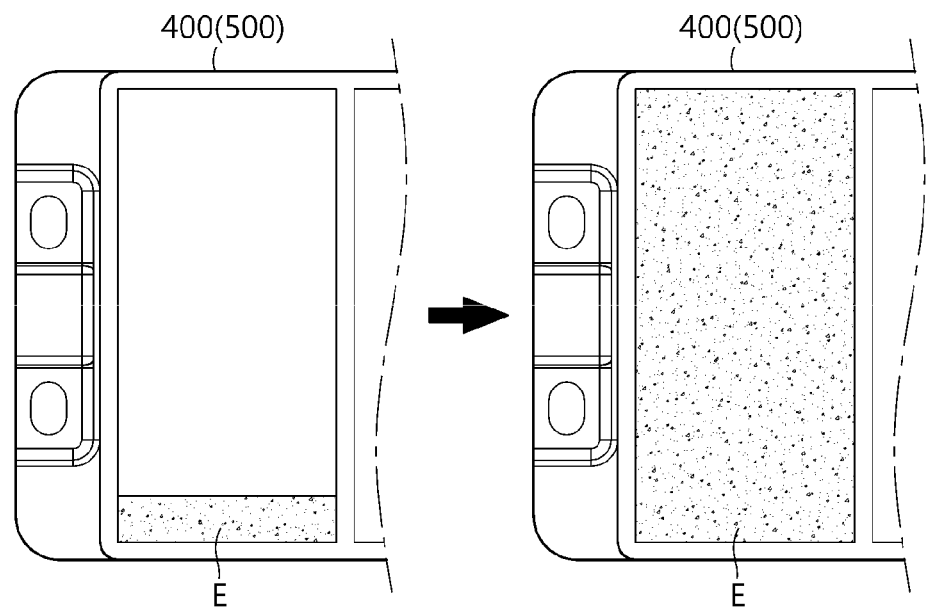
FIG. 8 is a diagram showing a part of a front surface of the battery module according to an embodiment of the present disclosure so that an expansion pad disposed inside the battery module is exhibited.

Referring to FIG. 8, the battery module 1 may further include an expansion pad E configured to at least partially close the air inlet 400 and the air outlet 500 so that the level of the cooling fluid rapidly increases when the cooling fluid is supplied into the battery module 1.

The expansion pad E is attached to an inner surface of the module housing 300 and has a size smaller than the opened area of the air inlet 400 and air outlet 500. When the battery module 1 is in normal use, the expansion pad E preferably has a size less than about 30% of the opened area of the air inlet 400 and air outlet 500 so that air may smoothly flows through the air inlet 400 and air outlet 500. Meanwhile, even though the figures of the present disclosure just depict that the expansion pad E is attached at a bottom portion of the inner surface of the module housing 300, the expansion pad E may also be attached to a top portion or a side portion of the module housing 300.

The expansion pad E is expanded by contacting the cooling fluid introduced into the battery module 1 to close the air inlet 400 and the air outlet 500. The expansion pad E contains a resin that exhibits a very large expansion rate when absorbing moisture, for example a resin that increases in volume by at least about two times or more compared to the initial volume when a sufficient amount of moisture is provided thereto. As a resin used for the expansion pad E, a non-woven fabric in which SAF (super absorbent fiber) and polyester staple fiber are mixed may be mentioned, for example. The SAF is prepared by forming a fiber using SAP (super absorbent polymer).

Meanwhile, when the air inlet 400 and the air outlet 500 are closed due to the expansion of the expansion pad E, this does not necessarily mean that the air inlet 400 and the air outlet 500 are closed so completely that the cooling fluid cannot leak, also includes the case where the opened area of the air inlet 400 and the air outlet 500 is decreased to reduce the amount of leakage.

By applying the expansion pad E, when a thermal runaway phenomenon occurs in at least some battery modules 1 and thus a cooling fluid is introduced into the battery modules 1, the air inlet 400 and the air outlet 500 are closed. If the air inlet 400 and the air outlet 500 are closed as above, the cooling fluid introduced into the battery module 1 does not escape to the outside but stays inside the battery modules 1, thereby quickly resolving the thermal runaway phenomenon occurring in the battery modules 1.

Figure 9:
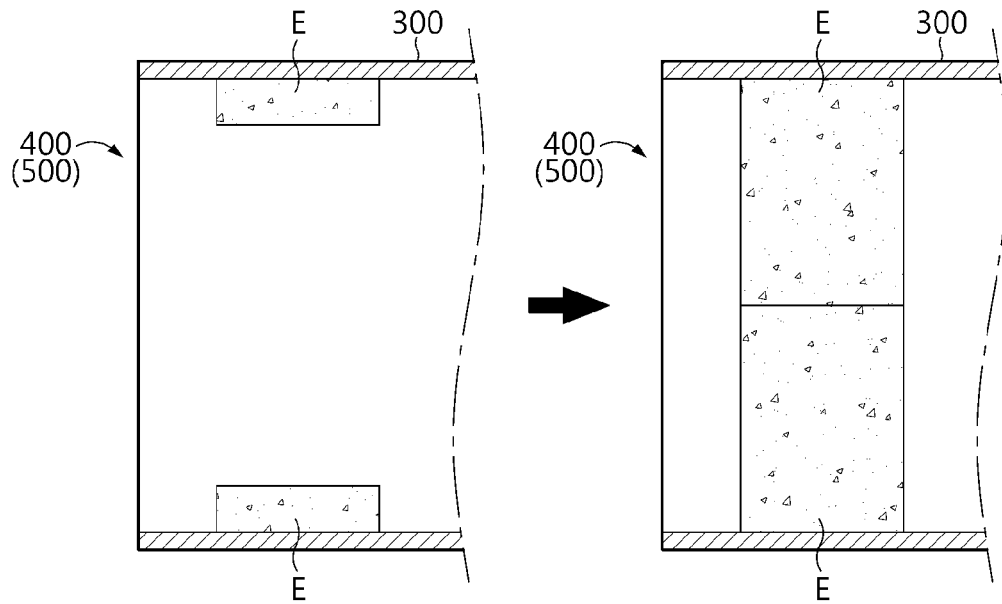
FIGS. 9 to 11 are diagrams showing a part of a section of the battery module according to an embodiment of the present disclosure, observed from a side, so that the expansion pad disposed inside the battery module is exhibited.

Referring to FIG. 9, the expansion pad E may be provided in a pair. In this case, the pair of expansion pads E are attached to an upper portion and a lower portion of the inner surface of the module housing 300, respectively. The pair of expansion pads E are attached at corresponding positions and come into contact with each other to close the air inlet 400 and the air outlet 500 when being expanded.

Figure 10:
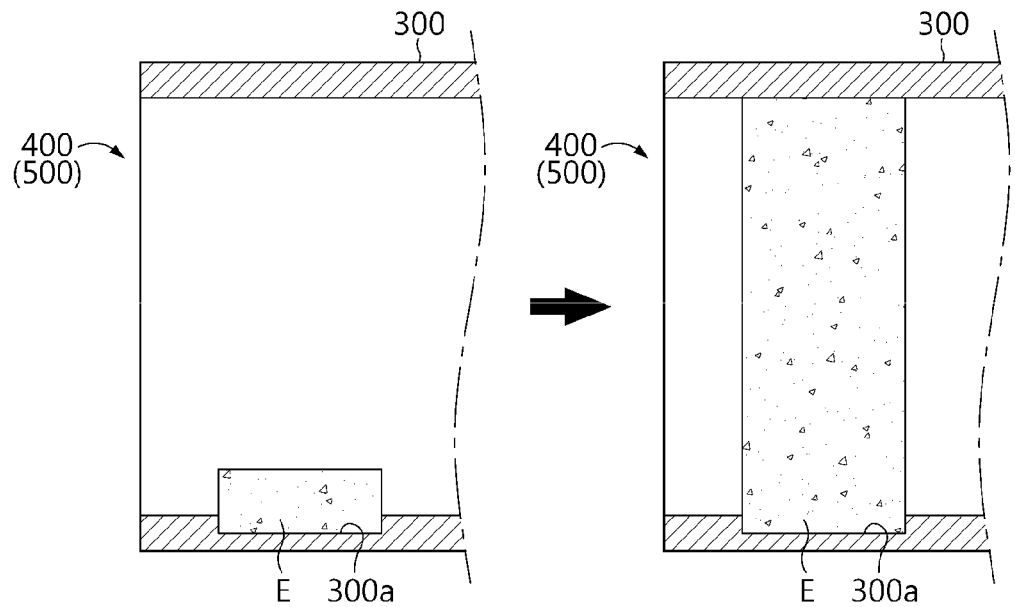

Referring to FIG. 10, the expansion pad E may be fixed by inserting at least a portion of the expansion pad E into an accommodation groove 300a formed to a predetermined depth at the inner surface of the module housing 300.

Figure 11:
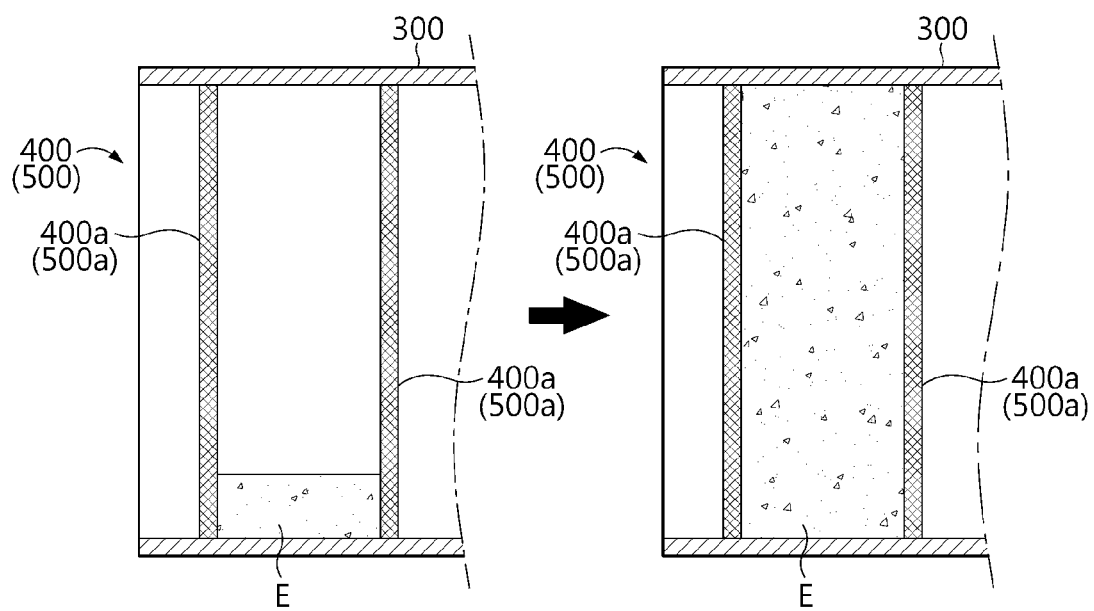

Referring to FIG. 11, the expanding movement of the expansion pad E may be guided by a pair of mesh plates 400a, 500a respectively disposed at both sides thereof when being expanded by absorbing moisture. The mesh plates 400a, 500a are mesh-type plates and have a structure that allows air and the cooling fluid to pass therethrough in a state where the expansion pad E is not expanded.

Meanwhile, an ESS (Energy Storage System) according to an embodiment of the present disclosure includes a plurality of battery modules according to an embodiment of the present disclosure as described above.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery module, comprising:
a cell stack including a plurality of battery cells;
a module housing configured to accommodate the cell stack; and
a sprinkler provided through the module housing at one side of the cell stack in a stacking direction,
wherein the sprinkler includes:
a coupler positioned at an outer side of the module housing and configured to be connected to a supply tube that supplies a cooling fluid;
a sprinkler head positioned at an inner side of the module housing and connected to the coupler; and
an insulation cover assembly having an insulation cover configured to cover the sprinkler head and an impeller assembly configured to cover an opening formed at a first end of the insulation cover in a longitudinal direction.

2. The battery module according to claim 1, wherein the sprinkler head includes:
a glass bulb provided to block a cooling fluid injection hole of the coupler and configured to be ruptured to open the cooling fluid injection hole when temperature or a flow rate of gas inside the battery module increases over a reference value; and
a holding bracket configured to fix the glass bulb while surrounding the glass bulb.

3. The battery module according to claim 2, wherein the insulation cover has a cover hole formed at a location corresponding to the glass bulb.

4. The battery module according to claim 3, wherein the impeller assembly includes:
an impeller frame fixed to the insulation cover and having an air input hole; and an impeller disposed in the air input hole and configured to rotate due to the flow of air introduced through the air input hole toward the glass bulb.

5. The battery module according to claim 1, wherein the module housing includes:
   a pair of base covers configured to cover a lower surface and an upper surface of the cell stack, respectively;
   a pair of side covers configured to cover side surfaces of the cell stack;
   a front cover configured to cover a front surface of the cell stack; and
   a rear cover configured to cover a rear surface of the cell stack.

6. The battery module according to claim 5, wherein the battery module comprises a pair of bus bar frames coupled to a first side and a second side of the cell stack in a width direction, respectively.

7. The battery module according to claim 6, wherein the sprinkler head and the insulation cover assembly are provided through the rear cover and positioned in an empty space formed between a first bus bar frame of the pair of bus bar frames and a first side cover of the pair of side covers.

8. The battery module according to claim 1, wherein a second end of the insulation cover is coupled to an inner surface of the module housing or the coupler.

9. The battery module according to claim 8, wherein a bonding layer is interposed between the second end of the insulation cover and the inner surface of the module housing or between the second end of the insulation cover and the coupler.

10. The battery module according to claim 9, wherein the insulation cover assembly is separated from the inner surface of the module housing or the coupler when a temperature inside the module housing rises so that the bonding force of the bonding layer is lost or decreased.

11. The battery module according to claim 1, wherein the battery module comprises at least one guide plate fixed inside the module housing and inclined so that one longitudinal end thereof is oriented toward the impeller assembly.

12. The battery module according to claim 5, wherein the battery module comprises:
   an air inlet formed through the front cover;
   an air outlet formed through the rear cover; and
   an expansion pad disposed at an inner side of the air inlet and the air outlet and configured to at least partially close the air inlet and the air outlet by expanding when contacting the cooling fluid introduced into the battery module.

13. The battery module according to claim 12, wherein the expansion pad is at least partially inserted into an accommodation groove formed at an inner surface of the module housing.

14. The battery module according to claim 12, wherein the battery module comprises mesh plates respectively disposed at opposite sides of the expansion pad to guide an expanding movement of the expansion pad.

15. An Energy Storage System (ESS), comprising a plurality of battery modules according to claim 1.

* * * * *